United States Patent

[11] 3,622,303

| [72] | Inventor | Eugene F. Hill<br>Southfield, Mich. |
|---|---|---|
| [21] | Appl. No. | 552,317 |
| [22] | Filed | May 23, 1966 |
| [45] | Patented | Nov. 23, 1971 |
| [73] | Assignee | Atomic Power Development Associates, Inc.<br>Detroit, Mich. |

[54] METHOD FOR REMOVING HYDROGEN FROM LIQUID ALKALI METALS AND THE LIKE
7 Claims, 4 Drawing Figs.

| [52] | U.S. Cl. | 75/66, 176/39 |
| [51] | Int. Cl. | C22b 27/00 |
| [50] | Field of Search | 75/66; 23/212; 176/39 |

[56] References Cited
UNITED STATES PATENTS

| 2,809,107 | 10/1957 | Russell | 75/67 |
| 2,882,212 | 4/1959 | Beard | 204/195 |
| 2,886,497 | 5/1959 | Butler | 204/195 X |
| 3,259,523 | 7/1966 | Faris et al. | 23/212 X |
| 3,290,406 | 12/1966 | Pfefferle | 23/212 X |
| 3,338,681 | 8/1967 | Kordesch | 23/212 X |
| 3,365,276 | 1/1968 | Childs et al. | 23/215 X |
| 3,387,969 | 6/1968 | Skladzien | 75/66 |

FOREIGN PATENTS

| 963,548 | 7/1964 | Great Britain | 75/66 |

*Primary Examiner*—L. Dewayne Rutledge
*Assistant Examiner*—Henry W. Tarring, II
*Attorney*—Ward, McElhannon, Brooks and Fitzpatrick CLAIM: 1. Method of removing hydrogen from liquid alkali metals which comprises: allowing such hydrogen to diffuse from such liquid metal at an elevated temperature through a bimetal barrier comprised of a first layer of metal selected from the group consisting of iron, nickel, tantalum and columbium and their alloys, which metal layer is in intimate contact with the liquid metal and a second layer of metal selected from the group consisting of palladium and platinum and alloys thereof, which second layer is in intimate contact with a gas containing oxygen, said first layer of metal providing resistance to corrosive attack on the barrier by the liquid metal, and said second layer of metal providing a catalytic action to convert the diffused hydrogen to $H_2\text{'}_0$.

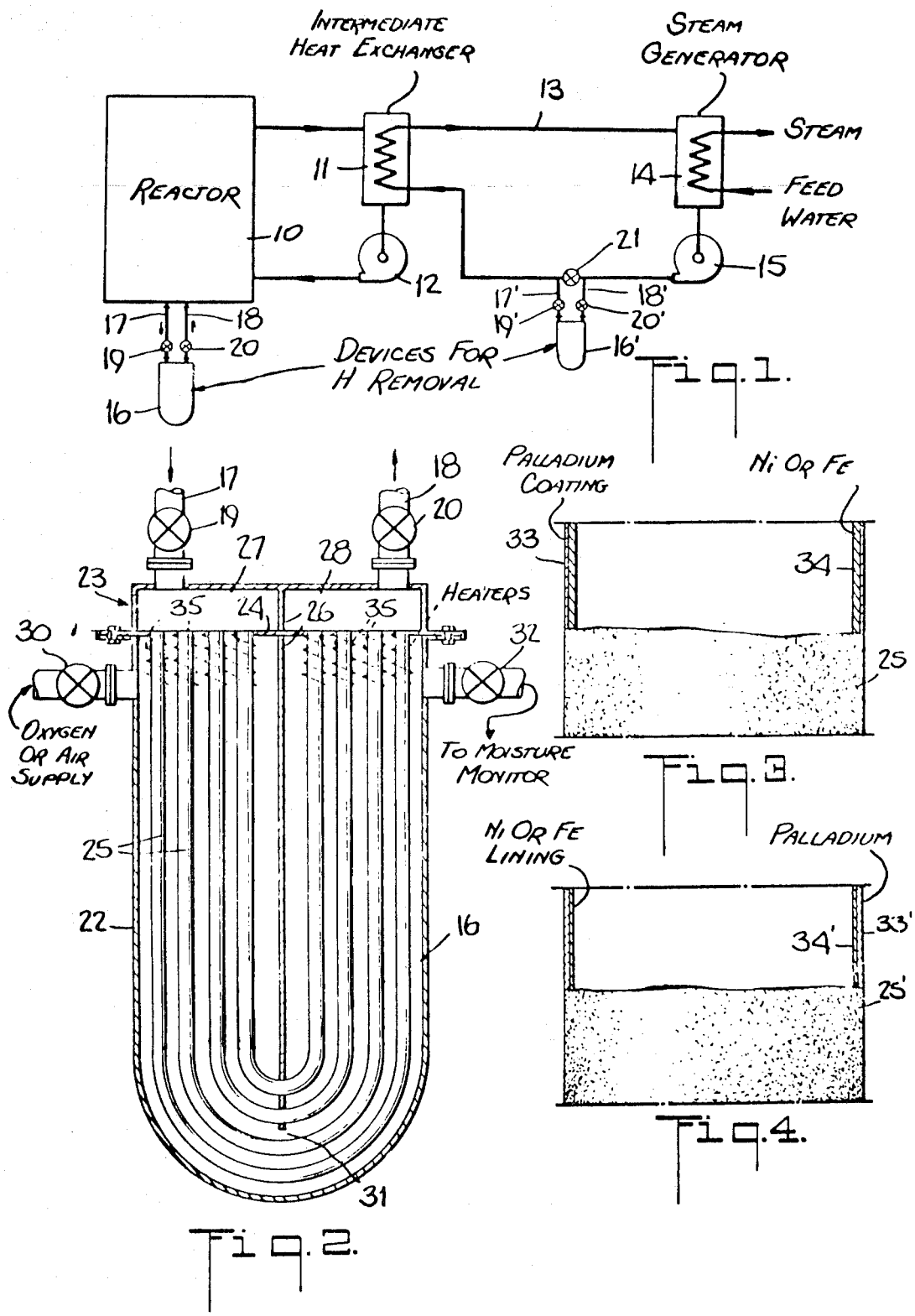

METHOD FOR REMOVING HYDROGEN FROM LIQUID ALKALI METALS AND THE LIKE

The invention described herein was made in the course of, or under, a contract with the U.S. Atomic Energy Commission.

This invention relates to the detection and removal of hydrogen, and, if desired, the measurement of the rate of removal thereof, or the amounts thereof as removed, from bodies or streams of liquid metal and the like, such as of sodium. More particularly, among other possible uses the invention is adapted for the detection and removal of small amounts of hydrogen from liquid metal coolants, such as of sodium or other alkali metals, as contained in the closed systems of nuclear reactors and associated alkali metal-water-steam-generating plants.

If water or other sources of hydrogen enter the liquid metal of such system, the hydrogen content of the cover gas increases, as does the hydrogen content of the contained sodium or other alkali metal. It is highly desirable to detect and remove such hydrogen, because it may cause considerable difficulties with regular detector systems and, in particular, in the primary system of sodium-cooled reactors, hydrogen can cause metal embrittlement and purification difficulties.

In general the present invention, in accordance with one of its preferred examples, involves a method for detecting and removing hydrogen from liquid metal and the like, such as used as coolants or heat-transfer agents for nuclear reactor systems and power plants, which method comprises bringing such coolant in its liquid phase into contact at an elevated temperature with a surface of a diaphragm or layer of palladium which is protected by a layer of another metal through which hydrogen will first be transmitted, and whereby the hydrogen will be then diffused through the palladium, and with the opposite surface of the palladium exposed to an oxidizing atmosphere, whereby the palladium acts as a catalyst, combining the diffused hydrogen with oxygen, thereby forming water. Such reaction creates a strong and efficient vacuum "pumping" effect which greatly increases the rate of diffusion of the hydrogen out of the liquid and alkaline the palladium. It may be further noted that this method makes possible a continuous, accurate, and sensitive way of measuring the rate of removal of the hydrogen, particularly when in small amounts, since the water as thus formed has a molecular weight nine times that of hydrogen, so that a gas chromatograph, or other suitable moisture monitor, may be used, for detecting and measuring the resulting moisture or water, which will be much more sensitive and convenient than any conventional method for measuring hydrogen as such.

While the invention will be described more particularly for use in connection with sodium-cooled reactors and sodium heat transfer loops for steam generating plants using such reactors, the invention is also well adapted for use in removing hydrogen from liquid potassium or potassium-sodium alloys which are used in heat exchange relationship with mercury, for example. The mercury is thus vaporized and is used to drive a turbine in a Rankine cycle type of power plant.

The invention is applicable to the removal of hydrogen from others of the alkali metals when in liquid form, such as rubidium and cesium, and is believed to be applicable also under some circumstances for the removal of hydrogen from the alkaline earth metals.

While the use of palladium, as above described, is preferred, certain alloys thereof, such as palladium silver alloys, may be considered as equivalents therefor, as may also platinum, although the diffusion of hydrogen through platinum is not so rapid as through palladium, and palladium may be generally more easily fabricated for the purpose.

The invention is not only applicable for the efficient removal of hydrogen as such from the liquid metal, but also hydrogen as combined in sodium hydroxide or water as contained in the sodium, as will hereinafter be further explained.

As an example of the efficiency of the method of the invention, even for the detection and removal of hydrogen in very small amounts, it may be noted that in a typical case where the sodium may contain some 10 parts per million of hydrogen, the hydrogen content may be reduced down to one-tenth of a part per million, and this may be done quite promptly, at low cost, with no moving parts being required, and with the apparatus confined to a relatively small space.

It has been heretofore known that hydrogen will diffuse through warm or hot diaphragms or walls of palladium and it has heretofore been proposed to use this principle for the removal of hydrogen from other gases. It has also been known that if air or oxygen is present at the surface of the palladium from which hydrogen is being diffused, then the palladium will act as a catalyst to cause combining of the hydrogen and oxygen at such surface to form water.

For reasons hereinafter explained, the adaptation of these principles for use in accordance with the present invention for removal of hydrogen from the liquid phase of the coolant or heat transfer material, has substantial advantages over the use of palladium for removing hydrogen from gases. Yet, if it were attempted to use palladium for this purpose with the hot liquid sodium or other alkali metal contacting directly with the palladium, the latter would tend to be attacked to a prohibitive degree. But this problem is overcome with the present invention by covering or coating the surface of the palladium which faces the hot liquid, with a layer of another metal which in general is impervious, but through which hydrogen will be transmitted or diffused to and through the palladium and into the presence of oxygen to form water by the aforesaid catalytic effect. For example, a coating or layer of nickel may be used which will transmit the hydrogen from the body of liquid metal (although at a slower rate than diffusion through palladium) and such nickel will not become attacked or corroded by the hot alkali metal at temperatures up to those useful for the present invention. Iron, preferably of a pure form, alternatively may be used. Tantalum and columbium will also transmit hydrogen and will be free of attack from hot liquid sodium up to substantial temperatures.

It may be noted that, in order to obtain rapid and effective removal of hydrogen from a body of liquid metal by allowing it to diffuse not only through a diaphragm of palladium, but also a protective layer of nickel or other metal as aforesaid, there must be a quite pronounced pumping effect. This effect may be achieved to a substantially higher degree, by making use of the above-mentioned catalytic effect of palladium on the diffused hydrogen in the presence of oxygen, than can be achieved by ordinary mechanical pumping devices. It can equal the pumping effect produced by very complicated and expensive diffusion pumps in cryogenic pumping devices. Furthermore, for reasons hereinafter explained the rate of such pumping by catalytic action is further very substantially enhanced when the hydrogen is being removed from hot liquid metal, as compared, with use of any similar principles for removing hydrogen from gases.

It may be noted that metals such as ruthenium, osmium, rhodium and iridium often occur as impurities in palladium or platinum and if present in the platinum or palladium as used for this invention, they would tend to give added mechanical strength thereto.

It may be further noted that when relatively large amounts of hydrogen are to be removed, the sodium is preferably carried in nickel or iron tubes coated on the outside with the palladium or platinum. But when the hydrogen merely is to be detected or removed in small amounts, then for a fast response time the preferable design appears to be to use a coil of nickel tubing inserted in a flowing stream of the sodium and coated on the inside with the palladium or platinum and with the air or oxygen flowing inside the tubing which is connected to a water detector.

In using the invention for hydrogen detection purposes, both the rate of gas flow and the concentration change of water in the gas caused by the oxygen and the hydrogen should be measured. Likewise the rate of sodium flow should be known in order to determine the hydrogen concentration in the sodium. For these purposes the apparatus should include flow meters in the oxidizing gas and in the sodium stream.

Various further and more specific objects, features and advantages of the invention will appear from the description given below, taken in connection with the accompanying drawings, illustrating by way of example preferred forms of apparatus for carrying out the invention.

In the drawings:

FIG. 1 is a schematic diagram of a typical nuclear reactor and steam-generating plant and indicating the locations therein where devices may be installed for removing hydrogen in accordance with the invention from the reactor coolant and from the intermediate liquid metal heat-transfer loop;

FIG. 2 is a vertical sectional view, somewhat schematically showing one example of a device for removing hydrogen in accordance with the invention; and FIGS. 3 and 4 are enlarged broken sectional views of two different forms of tubing which may be used in apparatus such as in FIG. 2.

In FIG. 1, a liquid sodium cooled reactor is schematically indicated at 10, from which the coolant may be circulated through an intermediate heat exchanger 11, as by a pump 12 in the conventional way. The heat exchanger is accompanied by an intermediate liquid sodium heat-transfer loop 13 extending to and from another heat exchanger 14, acting as a steam generator in a typical way, the fluid being circulated as by a pump 15.

The devices for removing hydrogen from the liquid alkali metal may essentially take the form of heat exchangers, in which suitable tubing is provided for carrying streams of the liquid metal, with the outer surfaces of such tubing coated or covered with palladium which is in contact with a flowing stream or streams of oxidizing gas. As indicated in FIG. 1, one of such devices, as at 16, may be connected (through suitable circulating means, if necessary) so that hot liquid metal coolant from the reactor is admitted to the device through a conduit 17, and returned back to the reactor through a conduit 18, suitable inlet and outlet control valves being provided at 19 and 20. Similarly, one of the devices as at 16' may be connected to receive the flow running through the intermediate heat transfer loop 13, and any desired portion of such flow may be bypassed from this device through an adjustable valve, as at 21. If preferred, the device 16 may be connected to the return line from the pump 12 to the reactor 10 in the same way that device 16' is associated with the intermediate loop.

As shown in FIG. 2, the device 16 may be contained in a suitable tank 22, formed for example of stainless steel, and having a removable cover assembly 23 containing a horizontal partition 24, from which numerous U-shaped tubes 25 are arranged to depend. The cover assembly also includes a partition 26 with portions depending down into the tank between the branches of the U-tubes. The upper ends of the tubes, as shown, open into the spaces 27 and 28 respectively, within the cover assembly, so that the liquid metal coming in through the conduit 17 flows into the space 27, thence down through the branches of the U-tubes at one side, and back up through the branches thereof at the other side, to space 28 in the cover assembly, and thence out through the conduit 18. A suitable supply of air or oxygen or other oxidizing gas, for example, flowing from a suitable pressure tank thereof, enters through a suitable adjustable or regulating valve 30, into the space within the container 22 surrounding the U-tubes at one side of the partition 26, to flow down around such tubes and through a space 31 beneath the partition 26; thence back around the other branches of the U-tubes, then out through an adjustable valve 32, and to suitable apparatus for detecting and monitoring the amount of moisture contained in the stream of oxidizing gas being discharged.

Each of the lengths of tubing man, as shown in the enlarged broken sectional view of a portion thereof of FIG. 3, carry on its exterior surface a coating or layer of palladium (or its equivalent) as indicated at 33, whereas the inner wall portions 34 of the tubing may, as shown, be comprised for example of nickel or pure iron.

Thus, any hydrogen contained in the liquid metal flowing through he tubes 25 will diffuse first through the nickel or iron wall portions thereof and then through the palladium into the presence of the streams of oxidizing gas, whereby, as above explained, a catalytic reaction is effective to form water (or steam) which may, upon passing from the device, be detected and measured by the moisture monitor.

Since the hydrogen will diffuse less rapidly through the iron or nickel than through the palladium, it may be desirable in some cases for this reason, among others, to construct the tubing, as at 25' in FIG. 4, with essentially the outer layer thereof of palladium 33' with a thin nickel or iron lining as indicated at 34'.

In a typical system operating at 1,200° F., or possibly within the range of 500° to 1,400° F., the tubing, as made of nickel or iron, typically may have an outside diameter of 0.75 to about 1 inch, and with a wall thickness of 0.040 to about 0.065 inch, for example, depending upon other design parameters. The total thickness of the tube walls is not critical, except for the need to meet design stress limitations; and the dimensions of the tube also are not particularly critical, and may vary from 0.5 inch in outside diameter to 2 inches in outside diameter, for example. The thickness of the palladium required may only be enough to cause catalytic action, viz, a thickness of 0.001 inch or even 0.0001 inch may be sufficient.

Devices such as shown in FIG. 2, or the equivalent, may, of course, be used to detect and remove hydrogen from liquid metal prior to its introduction into a reactor or heat transfer system, and whether the liquid metal is eventually to be used in connection with a reactor plant or otherwise.

The diffusion of hydrogen through the walls of the tubing of metals such as above referred to, occurs at rapidly increased rates at higher temperatures. While in some cases the following stream of liquid metal may already be at temperatures adequate for operation of the invention, it is desirable that the range be from about 500° F. to 1,400° F. To this end, in typical cases it may be desirable to surround the tubes in the device of FIG. 2 with suitable electrical heating coils or other elements, as indicated at 35, the amount of current feed thereto, of course, being made adjustable to achieve the desired temperature of the tube wall.

The iron or nickel, or the equivalent, as used for the tubing, should be quite free of pores, although, of course, capable of allowing the diffusion of hydrogen therethrough. Similarly the coating or layer of palladium should be free of porosity, and to this end it may be applied to the tubing by suitable known vapor plating techniques, for example.

It has been found for example that the thermal decomposition of a palladium compound is suitable for obtaining a coating in a nickel tube, but it is done in a liquid phase consisting of palladium chloride dissolved in hydrochloric acid. Ethanol and a small amount of turpentine are added to this solution and the inside of the tube is coated with this solution. The tube is then treated to cause the palladium to deposit on the tube wall.

It would appear that hydrogen as contained in the hot liquid metal such as sodium, is in a different form than when embodied in a volume of hydrogen gas or gas mixtures containing hydrogen. Apparently molecular hydrogen ($H_2$) becomes atomic hydrogen (2H) when dissolved in the hot liquid alkali metal, and thus id the hydrogen were caused to be diffused through the palladium and then pumped away as by a mechanical vacuum pump means, the atomic hydrogen would first change to the form of molecular hydrogen, which would involve a serious rate-limiting step in the pumping action. But when the hydrogen is diffused through the palladium in the presence of a stream of oxidizing gas, and immediately subjected to catalytic action to form water, this rate-limiting step is avoided. It may be noted that, if a mechanically operated vacuum pump were used to remove the hydrogen as diffused through the palladium, the speed and efficiency of such mechanical pumps become very low at pressures below $1 \times 10^{-8}$ mm. of Hg, whereas with the present invention, utilizing the catalytic pumping effect, thermodynamic calculations indicate that a pressure about 1×10 −8 millimeters of mercury may be attained. This will make possible the reduction of hydrogen in the sodium very rapidly, for example from some ten parts per million down to say one-tenth of a part per million. By mechanical vacuum pumping to lower the pressure difference across the palladium diaphragm, only a very much lower rate of hydrogen removal could be effected.

Furthermore, as above indicated, the present invention, involving, as it does, the removal of hydrogen from liquid metal rather than from a gas such as from the cover gas in a reactor, is highly advantageous in the interests of efficiency and from the standpoint of expense and rate of hydrogen removal, for reasons which will now be explained. At concentrations of hydrogen in sodium less than about 10 parts per million, the vapor pressure of hydrogen over the liquid sodium is proportioned to the square of the molar concentration of hydrogen in sodium. That is, the square root of the equilibrium pressure of hydrogen over sodium $P$ equals the molar concentration of hydrogen in the sodium, $C$, multiplied by a constant $K$ thus, $\sqrt{P}=KC$. The constant $K$ varies with temperature and also assumes a different value for the different alkali metals. Because of this situation, it it were attempted to remove the hydrogen directly from the gas cover over the liquid metal coolant in the reactor for example, then at least when the concentration of hydrogen becomes low, the vapor pressure of the hydrogen over the soidum becomes so small that removal thereof can only be accomplished with great difficulty at a very low rate. Additionally, as above indicated, the hydrogen as evidently dissolved in the liquid sodium, is no longer in its molecular form as when contained in a gas, and thus, as also above mentioned, can be diffused through the palladium and catalyzed to moisture much more rapidly than could molecular hydrogen. For example, if it were attempted to completely remove the hydrogen in the cover gas above the sodium in the reactor, to do so thoroughly would take a matter of many hours (more than 2 days, for example) whereas in accordance with the present invention, the hydrogen in the liquid sodium may be reduced from some five parts per million at 600° F., down to a fraction of one part per million, in a very short matter of time.

In the event water should enter the liquid sodium in the reactor or the alkali metal heat-transfer system therefor, the same would be converted to sodium hydroxide plus $H_2$; then, depending upon the temperature and concentration of sodium hydroxide, the following reversible reaction will occur in one direction or the other, viz:

$$2NaOH+Na \rightleftarrows 2Na_2O+H_2.$$

Thus, whether the hydrogen is present as such in the heated liquid metal, or as a hydroxide, or as a hydride, conditions will be such that the hydrogen can be detected and removed through the use of the palladium diaphragm means.

Although certain particular embodiments of the invention are herein disclosed for purposes of explanation, further modifications thereof, after study of this specification, will be apparent to those skilled in the art to which the invention pertains.

What is claimed and desired to be secured by Letters Patent is:

1. Method of removing hydrogen from liquid alkali metals which comprises: allowing such hydrogen to diffuse from such liquid metal at an elevated temperature through a bimetal barrier comprised of a first layer of metal selected from the group consisting of iron, nickel, tantalum and columbium and their alloys, which metal layer is in intimate contact with the liquid metal and a second layer of metal selected from the group consisting of palladium and platinum and alloys thereof, which second layer is in intimate contact with a gas containing oxygen, said first layer of metal providing resistance to corrosive attack on the barrier by the liquid metal, and said second layer of metal providing a catalytic action to convert the diffused hydrogen to $H_2O$.

2. Method in accordance with the foregoing claim 1, and in which the hydrogen is removed from the liquid alkali metal in the form of a stream or streams, which constitute the coolant or heat-transfer agent of nuclear reactor power plants.

3. Method in accordance with the foregoing claim 1, in which method said oxidizing gas is in the form of a stream flowing over the surface of said second layer, and the catalytic action at the surface of the second layer provides a pumping effect promoting said diffusion.

4. Method in accordance with claim 1, and in which the temperature of the liquid metal material at said barrier is maintained within a range of from about 500° F. to about 1,400° F.

5. Method in accordance with the foregoing claim 1, and in which said oxidizing gas is conducted through tubing immersed in the alkali metal material, said metal providing catalytic action being present on the interior of said tubing.

6. Method in accordance with claim 1, and in which said liquid alkali metal is caused to flow through tubing, and said oxidizing gas is caused to flow around the outside surfaces of said tubing, on which is located said metal providing catalytic action.

7. Method in accordance with claim 1, and including the step of measuring the resulting moisture content of the oxidizing gas.

* * * * *

UNITED STATES PATENT OFFICE
CERTIFICATE OF CORRECTION

Patent No. 3,622,303   Dated November 23, 1971

Inventor(s) Eugene F. Hill

It is certified that error appears in the above-identified patent and that said Letters Patent are hereby corrected as shown below:

Column 2, line 52, comma after "compared" should be deleted; column 4, line 2, "he" should be --the--; column 4, line 61, "id" should be --if--; column 4, line 73, "1x10'7EB6" should be --1x10$^{-6}$; column 5, line 1, "1x10-8" should be --1x10$^{-8}$--

Signed and sealed this 9th day of May 1972.

(SEAL)
Attest:

EDWARD M. FLETCHER, JR.
Attesting Officer

ROBERT GOTTSCHALK
Commissioner of Patents